UNITED STATES PATENT OFFICE.

VALDEMAR KJELDSEN, OF PORZ, GERMANY.

CEMENT MANUFACTURE.

SPECIFICATION forming part of Letters Patent No. 592,492, dated October 26, 1897.

Application filed December 19, 1896. Serial No. 616,324. (No specimens.) Patented in England September 2, 1895, No. 16,422.

*To all whom it may concern:*

Be it known that I, VALDEMAR KJELDSEN, a subject of the Emperor of Germany, residing at Porz, Germany, have invented new and useful Improvements in Connection with Cement Manufacture, (for which I have obtained a patent in Great Britain, No. 16,422, dated September 2, 1895,) of which the following is a specification.

This invention consists, essentially, in mixing with the raw material of which cement is composed a small quantity of previously-manufactured and burned cement composed of the same materials, this mixed product having qualities and advantages hereinafter more particularly stated. Such product being thus bound together by means of this small addition of a finished cement assumes a condition which preserves its integrity prior to the final burning to convert the whole into cement proper.

The object of my invention in the manufacture of cement is to make the blocks, and which I call "bricks," and which are finally to be burned in order to make them into cement, of such character and quality that there shall be no necessity of procuring special clay or other material or of treating the whole mass of the material composing the cement in order to give to such mass the requisite strength to be proof against the effects of the weather and other external forces. I effect this object by mixing with unmanufactured or raw cement material prior to molding it into such blocks or bricks a proportion of, say, from three to five per cent. of a manufactured cement which has been previously made from the same kind of raw material. This mixture of a small proportion of manufactured cement with the relatively large mass of raw or unmanufactured material results in important advantages, among which are the following, namely: It is proof against the effects of the weather and other external forces without the addition of special clay or other and a different material, the drying process can be dispensed with, and consequently also the plant and attendants therefor. My blocks prepared as above stated can be stored in the open air and can remain until required all ready for the cement-furnaces. The workmen at such furnaces can be employed throughout the whole year, and at the times when no cement is sold and the stock of cement would increase too rapidly they can be kept at work making these blocks in accordance with my invention, (and for which storage room can always be found,) and at the same time the cement-mills of the plant may be used for working the raw material for the blocks.

No special clay or other material need be brought from a distance, as the cement material at hand is all that is needed.

The cost of the cement needed to carry on my invention is very slight compared with the advantages obtained by the process, as the addition of three to five per cent. of the finished cement to the raw mass only means that from three to five per cent. of the finished product has to undergo double treatment as regards pressing, burning, and grinding.

Having now particularly described my invention, I claim—

1. The described improvement in the manufacture of cement, consisting in adding to the raw material which is to compose the cement, a small quantity say three to five per cent. of manufactured cement.

2. The described improvement in the method of manufacture of cement, consisting in adding to the raw material which is to compose the cement, a small quantity say from three to five per cent. of manufactured cement, forming this compound into blocks, and subsequently burning the blocks and grinding the product.

VALDEMAR KJELDSEN.

Witnesses:
E. CRONNER,
FIEBELKORN.